Feb. 4, 1930.  C. G. LOWEN  1,745,900
MEANS FOR POSITIONING AND HOLDING SENSITIZED PAPER ONTO THE EXPOSING
TABLE OR BOARD OF AN ENLARGING AND REDUCING PHOTOGRAPHIC CAMERA
Filed Dec. 23, 1927  3 Sheets-Sheet 1

INVENTOR
C. G. LOWEN

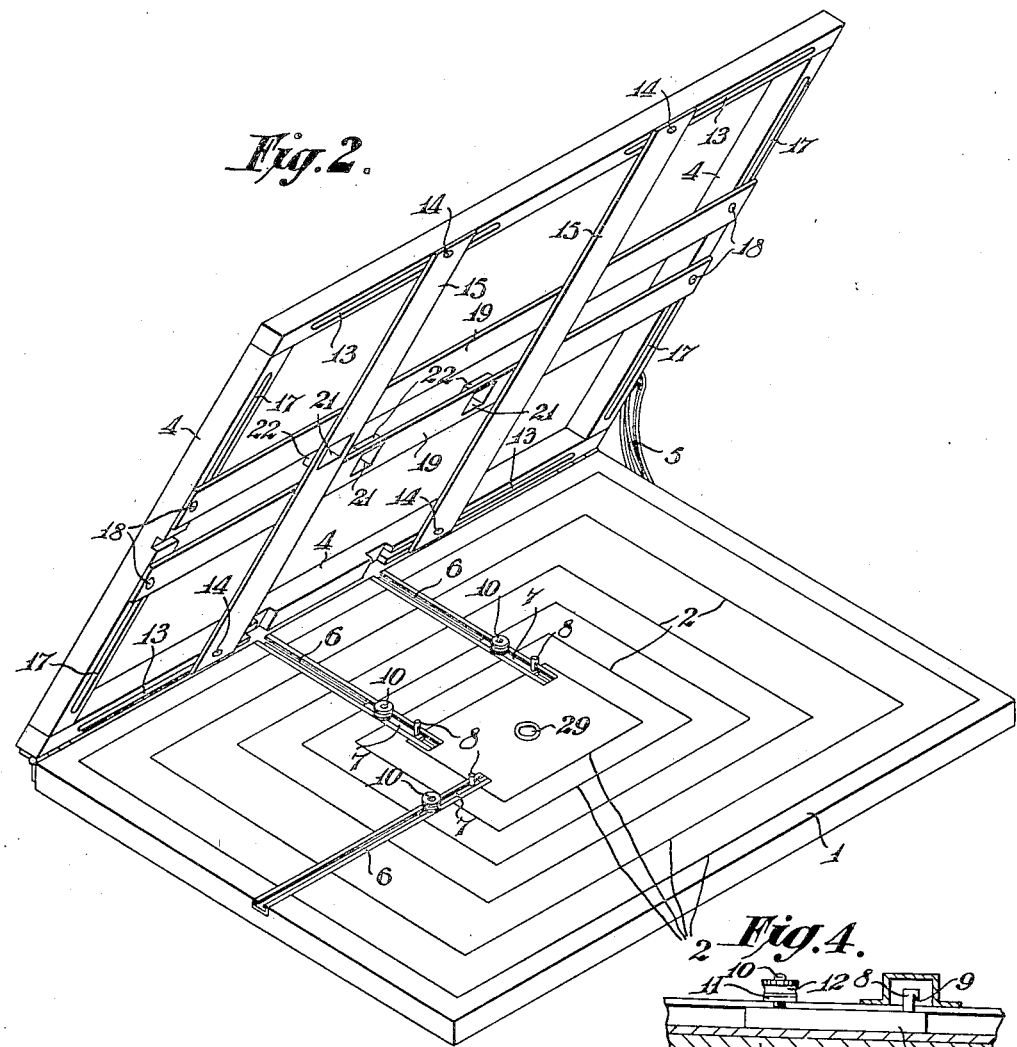
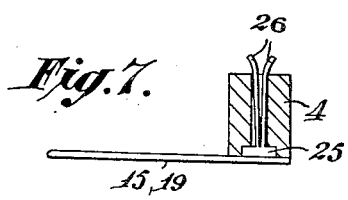
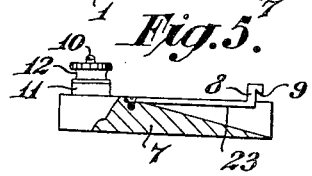
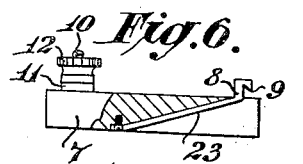

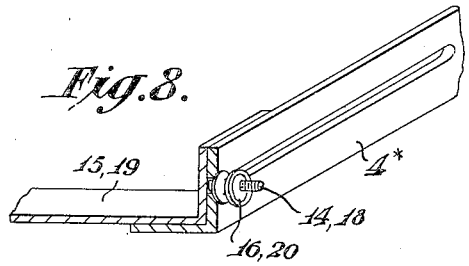
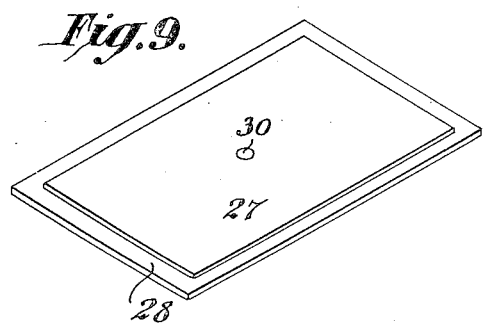
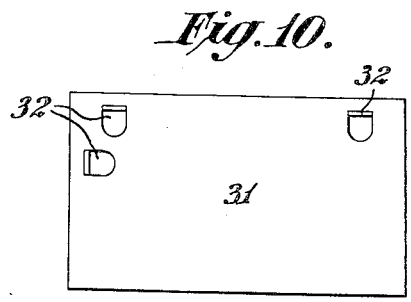
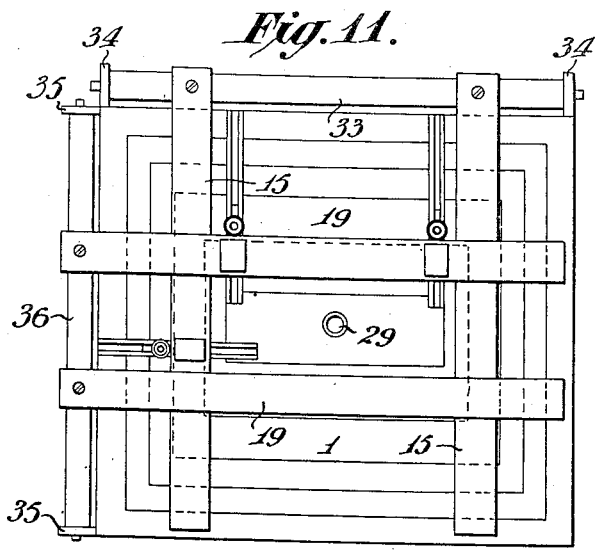

Patented Feb. 4, 1930

1,745,900

UNITED STATES PATENT OFFICE

CHARLES GEORGE LOWEN, OF LONDON, ENGLAND, ASSIGNOR TO E. T. PEARSON & CO. LIMITED, OF LONDON, ENGLAND, A BRITISH COMPANY

MEANS FOR POSITIONING AND HOLDING SENSITIZED PAPER ONTO THE EXPOSING TABLE OR BOARD OF AN ENLARGING AND REDUCING PHOTOGRAPHIC CAMERA

Application filed December 23, 1927, Serial No. 242,250, and in Great Britain December 31, 1926.

This invention, which relates to the enlarging and reducing of photographs, has reference to an improved means for positioning and holding sensitized paper on to the exposure board or table of a photographic camera, whilst at the same time masking the edges of the paper.

The invention provides for four masking blades arranged substantially in right-angular disposition to one another on the board, means for clamping said blades in an adjusted position to enclose a requisite open square, rectangular or other exposing area, and means for mounting said blades in respect to the table, whereby the clamped assembly may be moved away and returned to the same position thereon, and a device for enabling successive sheets to be placed on the board in the same position with respect to the clamped assembly.

In order that the invention may be the more readily understood, reference is to be had to the following description and accompanying sheets of drawings, wherein:—

Figure 2 is a perspective view of a preferred embodiment of the invention, shown in open position.

Figure 4 is a view of one of the positioning slides hereinafter referred to.

Figures 5 and 6 are sectional views illustrative of modified forms of positioning slides.

Figure 7 is a fragmentary view illustrative of a modified means for holding a masking blade in position.

Figure 8 is a fragmentary view illustrative of a modified arrangement of masking blade and frame.

Figure 9 is a perspective view illustrative of a template hereinafter referred to.

Figure 10 is a plan view illustrative of a modified form of template.

Figure 11 is a top plan view of a modified arrangement of the invention.

Like numerals of reference indicate corresponding parts in the several figures.

Figure 1:
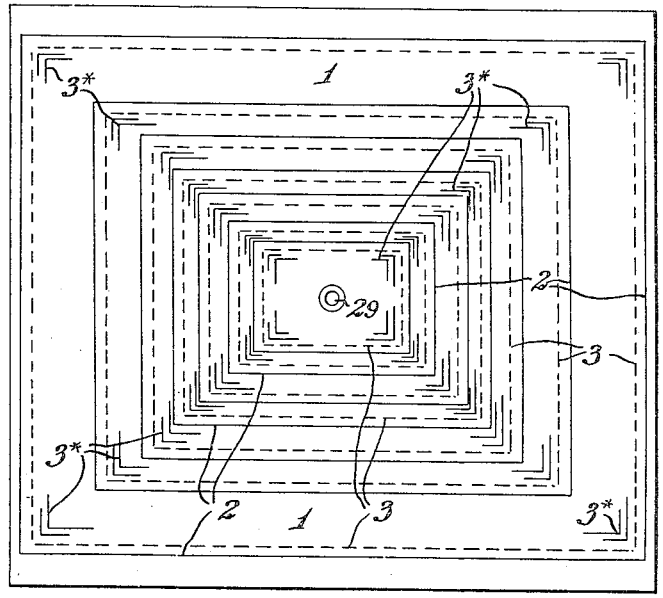
Figure 1 is a plan view of the exposure board or table.
Figure 3:
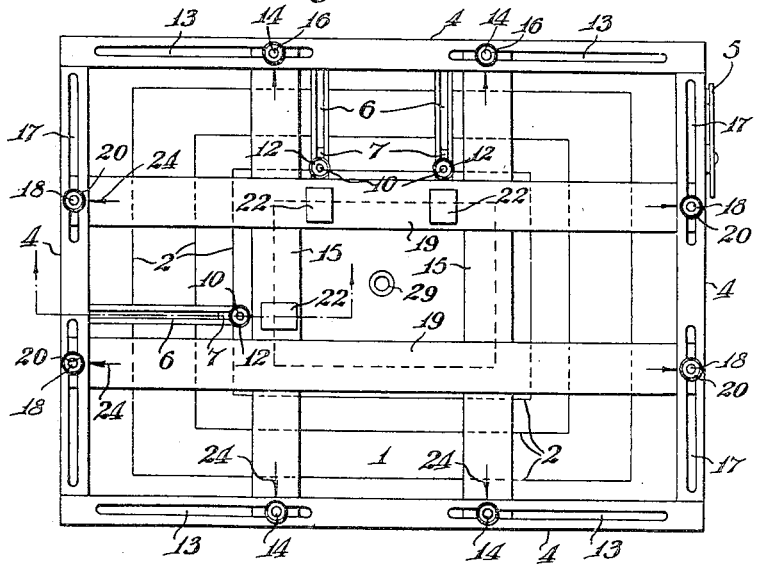
Figure 3 is a top plan view showing the same in closed-down position.

In carrying out the invention, and referring first to Figures 1, 2, 3 and 4 of the drawings, a rectangular table or board 1 is ruled in full lines 2 with a series of suitably spaced apart rectangles varying in sizes from, say, for example, post-card upwards, limited only by the size of the table, and within each full lined rectangle there is lined in dotted lines 3, another rectangle conveniently spaced apart from the full lines to constitute a border, said board or table 1 having hingedly connected thereto on one of its long sides a rectangular skeleton-like frame 4, a collapsible stay 5, or it may be stays, is or are hingedly connected to the short side or sides of the table and to the short side or sides of the frame aforesaid, being provided for the purpose of holding said frame in a raised position as and when required. The position for other dotted lines to give different widths of borders is indicated by reference numeral 3.

Each side of the transverse central line of the table 1, and at equal distances therefrom, is an inverted T or other slot 6 which extends, preferably, but not necessarily so, perpendicular from the hinge side of the board or table into the central or smallest rectangle, said T-slots 6 being let into said board or table so as to be flush with the top thereof.

Let into the board or table 1 so as to be flush with the top thereof is another inverted T-slot 6 which extends, preferably, but not necessarily so, perpendicular from one short side of the table into the central or smallest rectangle aforesaid, or, if desired, two of such slots, suitably spaced apart, may be employed.

Slidably mounted in each of the slots 6 aforesaid is a slide 7, of convenient length, provided towards its front end with a pin 8 arranged perpendicular thereto, said pins 8, preferably, but not necessarily so, being undercut in their height to provide hooks 9 facing towards the centre of the board or table. At the other end of each slide 8 there is provided a vertically disposed screwthreaded pin 10, which extends up through the T-slot 6 and is fitted with a washer 11 resting on the top of said T-slot, the threaded pin carrying a thumb-nut 12 wherewith to clamp the washer 11 against the slot 6 and lock the slide 8 in the same when in required position.

In each long side of the frame 4, and at equal distance each side of the transverse central line of the frame, there is provided a slot 13 which extends longitudinally towards the end of said long side and vertically through the thickness thereof, and through each slot there extends a threaded stud 14.

The studs 14 in each pair of oppositely disposed slots 13 in the long sides of the frame are carried by the outer ends of a thin flat steel blade 15, hereinafter termed masking blade which extends transversely the width of the frame, the stud ends being fitted with a thumb-nut 16 wherewith to lock the masking blades to the long sides of the frame.

In each short side of the frame 4, and at equal distance from the longitudinal central line thereof, there is provided a slot 17 which extends lengthwise of said short side towards the ends thereof and vertically through the thickness thereof, and through each slot 17 there extends a threaded stud 18. The stud 18 in each pair of oppositely disposed slots 17 in the short sides of the frame 4 are carried by the outer ends of a thin flat steel blade 19, hereinafter termed masking blade, which extends longitudinally the length of the frame 4, the studs 18 being fitted with a thumb nut 20 wherewith to lock said masking blades 19 to the short sides of the frame.

Further, the longitudinal masking blades 19 towards the hinged side of the frame is (see Figure 2), provided with two slots 21 positioned a convenient distance from the inner edge of said masking blade 19, said slots 21, which are spaced apart a distance to correspond to the distance between the pins 8 of the transverse slides 7, which are slidable towards and away from the hinge side of the band or table 1, being each covered over with a box 22 of a width less than the width of the masking blade 19 and positioned on the upper surface thereof, and these slots 21, if the slides 7 are arranged to slide in a direction other than perpendicular to the hinge side of the table, are made of such a length as to accommodate the pins of the slides in any position away from or towards the centre of the table, the boxes covering over the slots in the masking blades, being correspondingly lengthened.

In like manner is one, say, the left hand one, of the transverse masking blades 15 provided with a boxed-over slot 21 aligning with the pin 8 of the longitudinally slidable slide 7 which is slidable towards and away from the short side of the table, or it may be two boxed-over slots, one for each slide, if two longitudinally slidable slides are employed.

To set the device for, say, post-card size, the hinged stay or stays 5 aforesaid is or are collapsed and the frame 4 is closed down on to the board or table 1 aforesaid. The thumb nuts of all the masking blades are then slackened, and the two longitudinal masking blades 19 are moved towards one another till their inner edges align with the long sides of the dotted and inner rectangle, and the thumb nuts 20 of said longitudinal masking blades 19 are then screwed down on to the frame to lock said blades thereto.

In like manner are the transversely disposed masking blades 15 aligned with the short sides of said dotted and inner rectangle and locked in position.

The frame 4, and with it the masking blades 15, 15; 19, 19, is now raised and supported by the stay or stays aforesaid, and the slides 7, both the transversely slidable and longitudinally slidable, are now slid towards the rectangle till the undercut front of the pins 8 of said slides 7 align with the full longitudinal rear and left hand lines of the rectangle aforesaid, whereupon said slides 7 are, by screwing down their thumb nuts 12, locked in their T-slots 6, so that said pins 8 are positioned in right-angle formation.

The sensitized paper is now placed on the board so that the rear longitudinal edge and the left hand short edge of the paper contact with and are positioned by the pins 8 aforesaid, the hooks 9 in said pins 8, if said hooks be employed, engaging the curled edges of the sensitized paper, whereupon the stay or stays is or are collapsed and the frame 4 is lowered on to the board or table 1, so that the masking blades 15 and 19 press on the paper a width or margin equal to the distance between the full and dotted lines, respectively 2 and 3, of the rectangles, the boxed-over slots 21 fitting freely over the pins 8 of the slides 7, exposure then being made in the usual manner.

If desired, the pins 8, which pins 8 are the paper positioning stops, need not be a fixture on the slides 7 but may be so arranged thereon as to be depressed flush with the top edges of the T-slots by the downward movement of the masking blades, for instance, as shown in Figures 5 and 6, the pins 8 may be carried by a springy blade 23 affixed by one end to the slide 7 which would be suitably cut-away. In this case, the slots in the masking blades and the boxed covering said slots would be dispensed with.

Further, the sides of the frame may be provided with scales on the inside of the sides or on the top thereof and the blades fitted or not with a pointer 24 to register with said scale. When not fitted with pointers, then the inner edges of the masking blades would be used to register with said scales.

Further, in some cases, the table, towards its four edges, may be scaled to suit the travel of the masking blades 15, 19, and also that of the paper-positioning stops 8, and said masking blades 15, 19 may, as shown in Figure 7, be fitted at each end with a slide 25 working in a suitable guideway in the underside of the sides of the frame 4, said slides being a friction-tight fit in the guideways, or provided with any convenient means, such, for instance, as springy tongues 26 which extend through the slots in the sides of the frame 4, whereby they can be locked to the sides of the frames.

Although the frame aforesaid is preferably constructed with side members with square or rectangular shape in cross-section, yet each side member may, as shown by Figure 8, be constituted by an L-iron 4, the same being provided with longitudinal slots for the reception thereon of the threaded studs 14, 18 carried by the upturned ends of the masking blades 15, 19 as the case may be, the studs being fitted with their corresponding thumb nuts 16, 20.

To provide for an alternate means of setting the slides 7 and masking blades 15, 19, a number of templates from the post-card size upwards are provided, said templates each consisting of two pieces 27 and 28 of cardboard conveniently affixed together, as shown in Figure 9, and of such dimensions that the edges of the upper card correspond to the dotted lined inner rectangle, whilst the edges of the lower card correspond to the full lined outer rectangle, a template for each size.

In the centre of the lined exposure board or table 1 there is provided an internally threaded brush 29 let vertically into said board or table 1 and flush with the top thereof for the reception of a thumb screw passed through a hole 30 in the centre of the template to hold the same firmly down on to the table aforesaid after said template has been positioned over its corresponding rectangle, the masking blades 15, 19 being then brought into contact with the outer edges of the upper card, whilst the pins 8 of the slide members 7 are respectively brought into contact with the longitudinal rear edge of the lower card and the left hand edge thereof, said slides and said masking blades then being locked respectively to the exposure board or table and the hinged frame.

The frame is lifted and the template is then removed and the sensitized paper positioned and held down on to the table in the manner previously described.

Alternatively to the above, the bush and thumb screw aforesaid may be dispensed with, and in lieu thereof the template 27, 28 on its underside is provided with suitably positioned pins adapted to be engaged in correspondingly positioned holes in the exposure table aforesaid.

Alternative to the above, the cardboard template 27, 28 may be dispensed with, and in lieu thereof a template 31 of thin sheet metal may be employed, a convenient number of projections 32 being, as shown in Figure 10, formed or struck up on the upper surface of the plate 31 and at a distance from the edge thereof corresponding to the distance between the edges of the upper card and the lower card of the cardboard template aforesaid, pins or other means on the underside of the template being provided for holding the metal template 31 on to the board or table.

In cases where it is desirable that the frame be removed from the board or table, then said frame is hingedly and detachably connected, in any convenient manner, to said board or table.

In a modification of the invention, the hinged frame 4 and stay or stays 5 aforesaid may be dispensed with, and, as shown in Figure 11 of the drawings, a metal rod or bar 33 is positioned alongside a long side of the board or table 1 and by its end pivotally mounted in lugs or the like 34 conveniently affixed to said board or table 1.

Alongside one short side of the board or table 1 there is pivotally mounted in lugs or the like 35 affixed to said board or table, another rod or bar 36, and on said rod or bar 36 the longitudinal masking blades 19, 19 are by one end slidably and adjustably mounted, the transverse masking blades 15, 15 being by one end slidably and adjustably mounted on the rod or bar 33 aforesaid.

The above arrangement provides for the masking blades 15, 15 and 19, 19 being readily swung upwards away from or downwards on to the board or table 1 as and when required.

I claim:—

1. In a sensitized paper holder, the combination of a base and a skeleton frame hinged thereto, said base having slots therein, paper stops adjustably mounted in the slots, masking blades having covered slots and slidably and adjustably mounted in the skeleton frame, said covered slots registering with the adjusting means of the paper stops.

2. In a sensitized paper holder, a base for supporting sensitized sheets for photographic printing, marking lines on the base for indicating the size of the sheets and said base also having right-angularly disposed grooves, paper holding devices slidably and adjustably mounted in said grooves, a frame hinged to one side of the base, masking blades carried by the frame and arranged in pairs disposed in right-angular relation, and means for adjusting each member of each pair of blades to provide a central frame corresponding to the size of the sensitized paper.

3. In a sensitized paper holder, a base for supporting sensitized sheets for photographic printing, marking lines on the base for indicating the size of the sheets and said base also having right-angularly disposed grooves, paper holding devices slidably and adjustably mounted in said grooves, a frame hinged to one side of the base, masking blades carried by the frame and arranged in pairs disposed in right-angular relation, means for adjusting each member of each pair of blades to provide a central frame corresponding to the size of the sensitized paper, and means carried by the masking blades for receiving the adjustable means of the paper holding devices.

4. In a sensitized paper holder, a base lined with a plurality of rectangular spaces of decreasing dimensions, a skeleton frame hingedly connected to the base, a pair of longitudinally disposed and another pair of transversely disposed masking blades carried by the frame, and paper holding means carried by the base, said means comprising a plurality of adjustable paper holding devices, certain of which are movable at right-angles to the other.

5. In an exposure board for supporting sensitized sheets for photographic printing, a base having sheet marking lines thereon and a plurality of grooves, channel members fitted in the grooves, paper holding devices slidable in the grooves and including paper engaging pins and means for clampingly engaging said channel members, a skeleton frame hinged to one side of the base, and a plurality of masking blades adjustably carried by the frame and arranged in angular relation to mask the edges of the paper held beneath said pins and covered slots formed in certain of said masking blades for accommodating said means on the paper holding devices for clampingly engaging the channel members.

6. In an exposure board for supporting sensitized sheets for photographic printing, the combination of a base having marks thereon for indicating the position of the sheet and also provided with slots, paper holding devices slidable in said slots, said paper holding devices each including a slidable body having resilient paper engaging means thereon and means for securing said body in its slot, means for masking the edges of the sensitized paper including a support hinged to one side of the base and masking blades carried by said support.

7. In an exposure board for supporting sensitized sheets for photographic printing, a base for marking lines thereon for aiding the positioning of the sensitized sheets, sheet holding means on the base, means for positioning successive sheets on the base comprising a template detachably affixed to said base, a masking blade support pivotally carried by the base, and adjustable masking blades mounted on said support and adapted to overlie the edges of the sensitized sheet.

In testimony whereof I have affixed my signature hereto this 9th day of December, 1927.

CHARLES GEORGE LOWEN.